US005975813A

United States Patent [19]

Schmotzer

[11] Patent Number: 5,975,813
[45] Date of Patent: Nov. 2, 1999

[54] SINGLE FLUTE DRILL AND METHOD OF CONSTRUCTION

[76] Inventor: Norman H. Schmotzer, 637 Shore Rd., North Palm Beach, Fla. 33408

[21] Appl. No.: 09/019,077

[22] Filed: Feb. 5, 1998

[51] Int. Cl.$^{6}$ ........................ B23B 51/02
[52] U.S. Cl. ........................ 408/214; 76/108.6; 408/230
[58] Field of Search ........................ 408/230, 214; 76/108.6

[56] References Cited

U.S. PATENT DOCUMENTS

| | | | |
|---|---|---|---|
| 413,159 | 10/1889 | Bailey | 408/230 |
| 750,537 | 1/1904 | Hanson | 408/230 |
| 2,769,355 | 11/1956 | Crisp | 408/230 |
| 3,824,026 | 7/1974 | Gaskins | 408/230 |
| 4,625,593 | 12/1986 | Schmotzer | 408/211 |
| 5,160,232 | 11/1992 | Maier | 408/230 |

*Primary Examiner*—Steven C. Bishop
*Attorney, Agent, or Firm*—McHale & Slavin PA

[57] ABSTRACT

A wood drill and method for is manufacture are disclosed. A drill body has a single spiral land and a holding shank. The top of the web has an axial hole receiving a projection from a separate lead screw and the top of the spiral land has a notch for receiving a carbide cutting insert. The replaceable lead screw and carbide cutting insert are fixed to the drill body and the inserts and lands are ground to provide the proper hole sizing tips and cutting surfaces.

16 Claims, 2 Drawing Sheets

SINGLE FLUTE DRILL AND METHOD OF CONSTRUCTION

FIELD OF THE INVENTION

This invention relates generally to drills and, more particularly, to a single flute wood drill and method of construction.

BACKGROUND INFORMATION

Drills are well known in the art. The style of drill and method of construction is the subject of numerous patents each directed to various materials used for the body including the spiral lands, holding shank; cutters, and inserts. The teachings of which disclose materials having improved properties to provide a cutting part having a longer life.

Many steel alloys have been used for the main drill body, while carbides, for example, have been used for the cutter, or insert. Materials, used for a drill body and cutters are set forth in the following patents: U.S. Pat. No. RE 19,182; U.S. Pat. No. 1,887,374; U.S. Pat. No. 4,008,976; U.S. Pat. No. 4,143,723; U.S. Pat. No. 4,134,616; and U.S. Pat. No. 4,356,873. The inventor disclosed in U.S. Pat. No. 4,625,593 a method of constructing a wood drill including a method of forming a web with two spiral lands, the disclosure of which is incorporated herein by reference. However, it has been discovered that a single flute drill having the particular shape of the instant invention, provides excellent chip removal without excessive strain of the driving tool. Thus, while various cutting tips and lengths of lands as well as inserts of a different material from the body of the drill have been used, none of the prior art patents discloses instant drill construction.

SUMMARY OF THE INVENTION

The instant invention satisfies this need through provision of a drill having a direction of rotation for drilling formed from a single piece spiral flute characterized by an upper and lower surface. The land being 25–35% of the lead. A top end of the drill is flat for receipt of a replaceable lead screw and cutting insert. A bottom end of the drill is formed into a holding shank for attachment into a drilling machine. The lead screw and cutting insert is secured to the drill top by brazing.

The single spiral flute extends from the top downwardly to form a self-feeding drill. The top of the drill has a flat surface substantially perpendicular to the length of the spiral land and the flat top includes an axial hole formed therein. A notch formed in the top extends from the outer end of the land and has a first surface facing forwardly in the direction of rotation of the drill. The location of the first surface leaves a thickness of the top and a second surface extends forwardly from the bottom of the first surface forming an upwardly facing platform. A portion of the top is removed in the direction of rotation of the drill starting at the forward edge of the desired width of the notch from the first surface. The lead screw has a bottom axial projection fitting into the axial hole in the flat top.

A carbide cutting insert is placed in the notch with one side against the first surface of each notch, its bottom against the second surface of the notch, and its inner end against the lead screw. The lead screw and carbide inserts are brazed in place on the drill with braze material filling the portion of the top wall removed. The insert is contoured, such as by grinding, to fit against the lead screw and for preparation of a proper cutting surface.

Another objective of the invention is to provide a single flute drill wherein the lead screw and the carbide cutting insert can be removed and replaced when necessary. This facilitates the repair of a drill if the lead screw is damaged or if the cutting insert need replacing in view of exceptional wear or other damage. This capability permits an economical repair of the drill.

A further objective of this invention is to provide a wood drill with improved cutting ability and which will retain its sharpness longer by using carbide.

Another object of this invention is to provide a wood bit which self-feeds, or draws itself, into a hole it is forming with minimum force being applied by the operator with less torque requirements then a multiple flute shape.

A further objective of the invention is to provide a wood drill with an improved chip removal capability. A groove is provided on the spiral under surface of the land located radially inwardly from the outer end of the land.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 2:
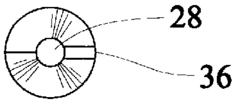
FIG. 2 is a top view of FIG. 1.
Figure 1:
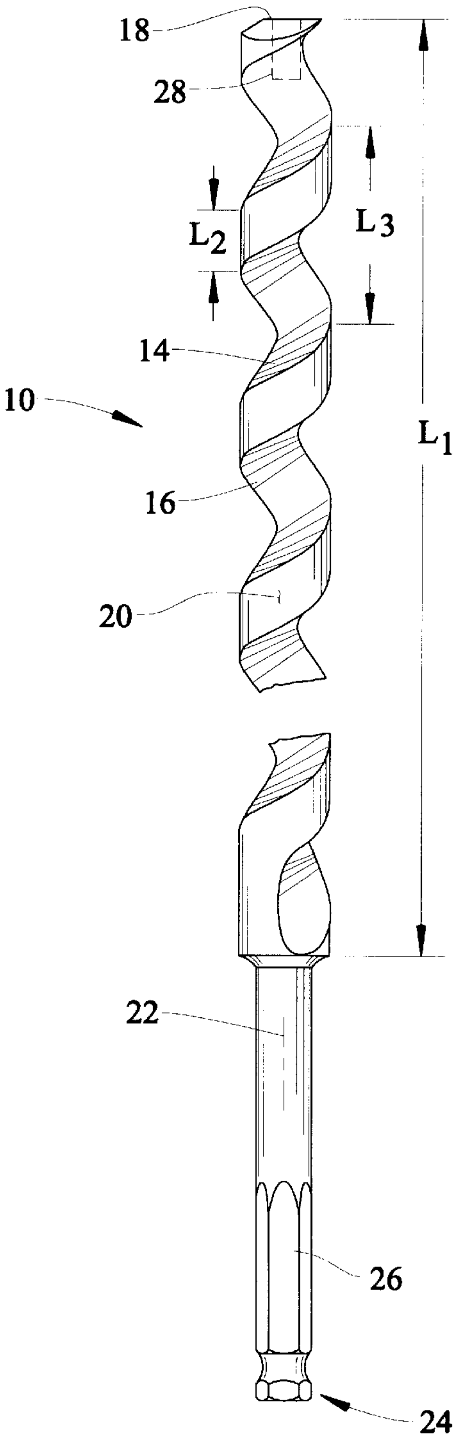
FIG. 1 is a side elevational view of a drill body having a single flute.
Figure 3:
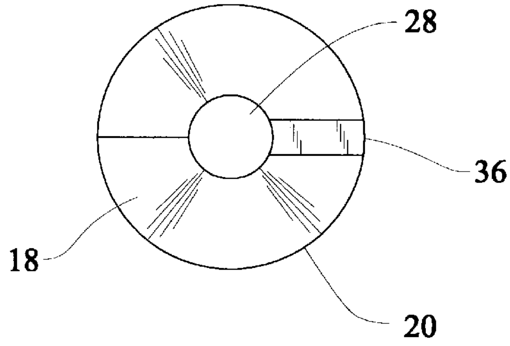
FIG. 3 is an enlarged view of FIG. 2.

Referring to the drawings, FIG. 1 depicts the single flute drill 10 of instant invention having a direction of rotation to form a self feeding drill. The drill body consists of a single piece spiral land 12 having a length "$L_1$" characterized by an upper spiral surface 14 and a lower spiral surface 16. Depth "D" is approximately 40% of the drill blank diameter. The land "$L_2$" is 25–35% of the lead "$L_3$". A top end 18 of the spiral land 12 is flat. The spiral land 12 is further characterized by an outer side surface 20 which is flat and parallel to an axis 22 of the drill body. A helix angle A is between 18 degrees and 42 degrees with a preferred embodiment between 28 degrees and 32 degrees. The cutter angle B is between 25 degrees and 50 degrees, the preferred embodiment between 35 degrees and 40 degrees. Chip removal is along the upper spiral surface and carried toward the bottom end 24. The bottom end 24 of the spiral land 12 is formed into a holding shank 26, the holding shank 26 may be one of many constructions well adapted to be releaseably clamped in the holding device of a suitable driving unit known in the art. The driving unit does not form a part of the invention.

Figure 5:
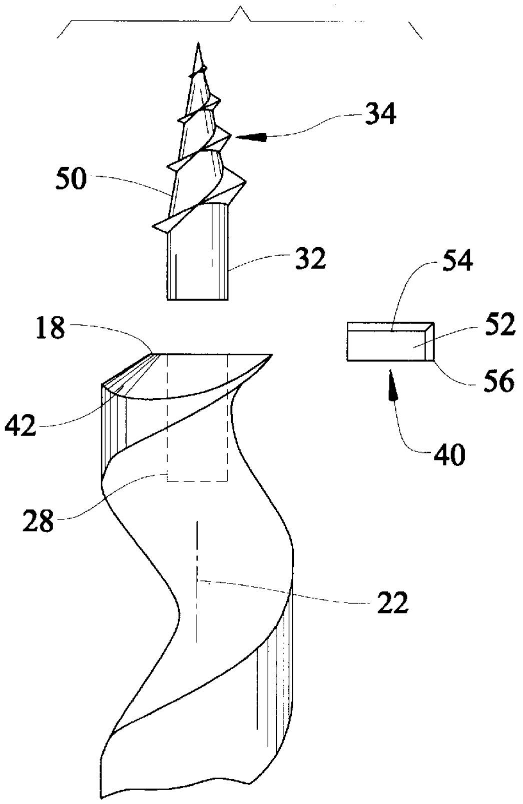
FIG. 5 is a exploded view of the lead screw and cutting insert.

The flat section of the top end 18 includes a hole 28 along the axis 22 of the drill body (also see FIG. 5). The hole 28 forms an aperture that extends through the top portion 30 of the spiral land 12 along the axis 22. The hole 28 is sized to frictionally receive the bottom axial projection 32 of a lead screw 34, to be hereinafter discussed. The lead screw 34 is replaceable being first press fit into the hole 28 and then secured to the drill body by weldment.

A notch 36 is formed in the flat top 18 of the spiral land 12 extending from the outer surface 22 of the land 12 to the hole 28. The notch 36 has a desired width formed for receipt of a cutting edge 40 hereinafter discussed. The notch 36 has a first surface 42 facing forwardly in the direction of rotation of the drill, the forwardly facing first surface 42 leaving a portion on the top of the land 12 having a flat top surface. The notch 36 having a second surface 44 extending forwardly from the bottom of the first surface 42 to a forward edge 46.

A portion of the spiral land 12 is removed in the direction of rotation of the drill starting at the forward edge of the width of the notch 36. The portion removed will receive braze material in a later described method of construction. The portion removed may be in many shapes, but is preferably a curved triangular shape portion leaving a curved slanted surface for receive of the braze material to permit ease of insertion and passage into the item to be drilled.

As referred to above, a separate lead screw 34 is formed having a threaded section 50 and a bottom axial projection 32 which is sized to fit into the hole 28 for being held therein. The threaded section 50 may be six to twenty threads per inch, or any amount therebetween, depending upon the type of material to be drilled. The threaded section 50 is formed from a high speed cobalt tool bit eliminating the need to forge the lead screw.

Figure 4:
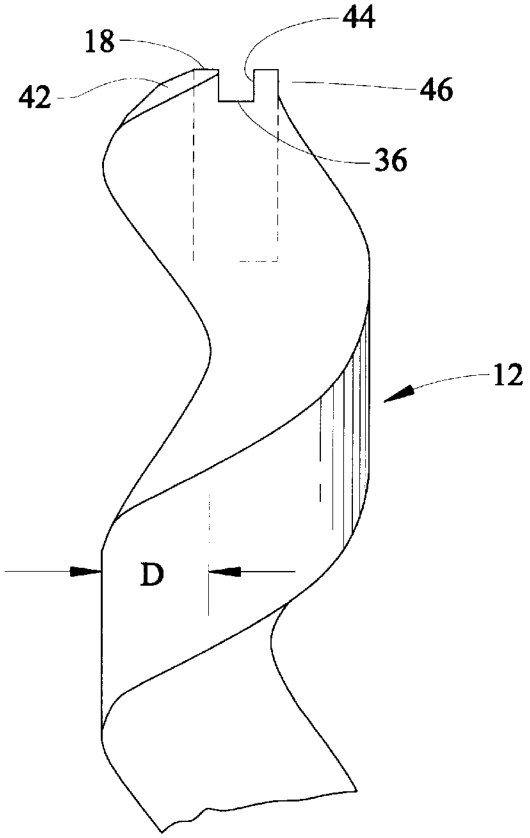
FIG. 4 is a partial side elevation view of the drill body depicting the cutting insert mounting notch.
Figure 7:
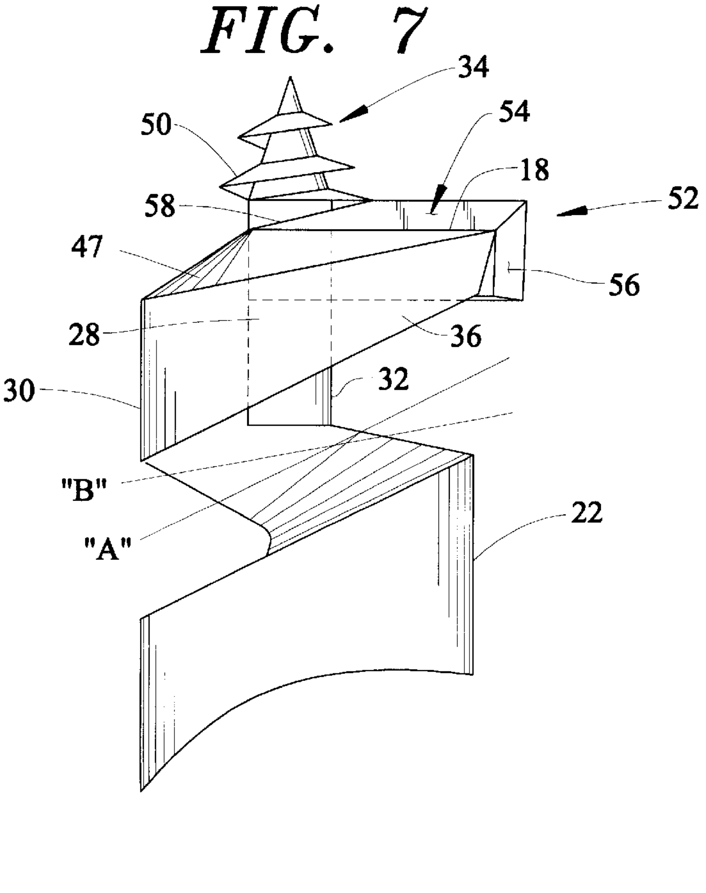
FIG. 7 is an enlarged view of the lead screw and cutting insertion tip.

Carbide cutting insert 40 is replaceably insertable into the notch 36. A tip 52 of the carbide insert 52 being positioned at the outer side 22 of the land 12, (see FIGS. 4 & 7) the notch 36 having a first surface 42 facing in the direction of rotation of the drill and a second surface 44 extending from the bottom of the first surface 42 forming a platform between the hole 28 and an end of the spiral land 12. The cutting insert 40 includes a chamfered top edge 54 and outer edge 56 providing a sharp edge for cutting. The carbide cutting insert 40 is placed in the notch 36 with the bottom surface of the insert positioned against the bottom surface of the notch. The cutting insert 40 is positioned radially inwardly so that the inner end becomes positioned adjacent the axial projection 32 of the lead screw 34. If the threaded section 50 of the lead screw 34 interferes with the positioning of the carbide insert 40, so that it cannot be placed close enough to the axial projection 32 for proper brazing, the upper corner 58 of the insert can be notched as depicted.

Figure 6:
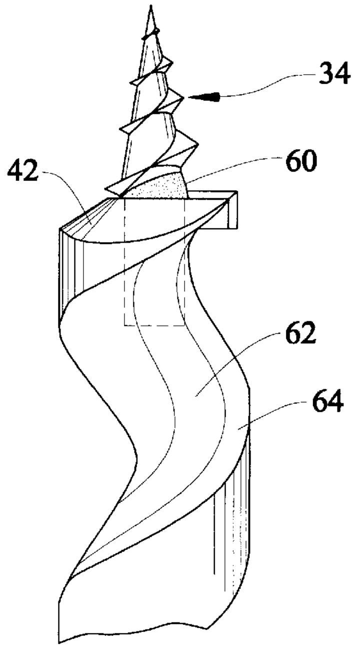
FIG. 6 is side elevational view of the lead screw and cutting insert brazed to the drill body.

The lead screw 34 and carbide cutting insert 40 are brazed into position using brazing material 60. The brazing material 60 forms a holding action between the bottom axial projection 32 and the hole 28 and between the carbide cutting insert 40 and the spiral land 12. The brazing material enters the area where the portion of the wall 42 is removed to provide an additional brazing of the lead screw 34 and to each other. The upper surface 14 of the spiral land 12 may also include a groove 64 and a raised outer edge 62 for improved chip removal capability (see FIG. 6).

The method of constructing the single flute drill 10 requires the forming of the spiral land 12 to a length so as to cause the spiral land to extend at least the length of a hole to be drilled. The spiral land, having an upper 14 and lower 16 surface, has a flat top with a hole and notch 36 formed therein. A holding shank 26 is formed at the bottom of the spiral land 12, the holding shank allows the drill body to be clamped in the holding device of a suitable driving unit.

The lead screw 34, having a bottom axial projection 32, is sized for insertion into hole 28. Further, the cutting insert is formed for insertion into the notch 36 adjacent to the bottom axial projection 32 of the lead screw 34. The lead screw 34 and cutting insert 40 are then brazed into position and the drill contoured to provide a sharp forward edge for cutting. The cutting insert having the projecting cutting tip 56 at its outer end 20 which is in line with the outer surface of the spiral land. The construction may also include a deep spiral groove in the upper surface of the spiral land and forming a spiral raised end in said spiral surface.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A method of making a single flute self-feeding drill having a direction of rotation for drilling, said method comprising:

(1) forming a spiral land having a lead and having a length at least a length of a hole to be drilled, said spiral land having an upper and lower spiral surface, a helix angle between 18 degrees and 42 degrees, a cutter angle between 25 degrees 50 degrees, a depth of approximately 40 of said drill's blank diameter and wherein the length of said spiral land is 25 to 35% of the length of said lead;

(2) forming a top of said spiral land as a flat portion with said top of said spiral land extending outwardly to an outer side surface;

(3) placing a centrally disposed hole into the top end of said spiral land;

(4) forming a notch in the top end of said spiral land extending from said outer side surface to said centrally disposed hole, said notch having a first surface facing in the direction of rotation of said drill and a second surface extending from the bottom of said first surface in the direction of rotation of said drill forming a platform;

(5) forming a lead screw having a bottom axial projection for fitting into said hole in said top end of said spiral land;

(6) forming a cutting insert for placement in said notch against said first and second surfaces respectively;

(7) placing a bottom axial projection of said lead screw into said hole;

(8) placing said cutting insert into said notch adjacent to said bottom axial projection of said lead screw;

(9) fixing said lead screw and inserts to each other and to said spiral land;

(10) contouring said cutting insert and adjacent spiral land to provide a sharp forward edge for cutting; and

(11) forming a holding shank at said bottom of said spiral land.

2. The method according to claim 1 wherein step 10 includes contouring said cutting insert with a projecting cutting tip at its outer end extending beyond the outer side surface of said spiral land.

3. The method according to claim 1 wherein said lead screw and said cutting insert is brazed to each other and to said spiral land.

4. The method according to claim 1 wherein said upwardly facing platform includes a forward edge having said contour of said lower spiral surface.

5. The method according to claim 1 wherein said notch is formed perpendicular to said outer end of said spiral land.

6. The method according to claim 1 wherein said cutting insert includes an upwardly extending projection at one end for positioning at the outer end of said notch, step 10 includes contouring of said upwardly extending projection with the outer side surface of said spiral land.

7. The method according to claim 1 wherein step 1 includes forming a deep spiral groove in the upper spiral surface of said spiral land and forming a spiral raised end in said upper spiral surface of said spiral land adjacent said outer side surface of said spiral land.

8. A single flute self-feeding drill having a direction of rotation for drilling, said drill comprising:

a single spiral land means for drilling through wood, said spiral land means having a lead and being characterized by a helix angle between 18 degrees and 42 degrees, a cutter angle between 25 degrees and 50 degrees, a depth of approximately 40% of said drill's blank diameter and wherein the length of said spiral land is 25 to 35% of the length of said lead, said spiral land means having a length with a top end and a bottom end, said bottom end forming a holding shank; a replaceable lead screw means securable in a hole centrally disposed in said top end of said spiral land means; and, a replaceable cutting insert means securable in a notch disposed between said hole and an outer side surface of said spiral land means.

9. The drill according to claim 8 wherein said lead screw means is secured to said spiral land means by brazing.

10. The drill according to claim 8 wherein said cutting insert means is secured to said spiral land means by brazing.

11. A single flute drill having a direction of rotation for drilling, said drill comprising: a single piece spiral land having a lead and a length characterized by an upper and lower spiral surface, said spiral land being further characterized by having a helix angle between 18 degrees and 42 degrees, a cutter angle between 25 degrees and 50 degrees, a depth of approximately 40% of said drill's blank diameter and wherein the length of said spiral land is 25 to 35% of the length of said lead, a top end of said spiral land forming a flat top and a bottom end forming a holding shank; a replaceable lead screw securable to said top end of said spiral land means, said top end having a centrally disposed hole receptive to an axial projection of said lead screw; a replaceable cutting insert securable in a notch, said notch having a first surface facing in the direction of rotation of said drill and a second surface extending from the bottom of said first surface in the direction of rotation of said drill forming a platform between said hole and an end of said spiral land means.

12. The drill according to claim 11 wherein said lead screw is secured to said spiral land means by brazing.

13. The drill according to claim 11 wherein said cutting insert is secured to said spiral land means by brazing.

14. The drill according to claim 13 wherein said cutting insert includes an end notch at its inner end for placement adjacent to said lead screw.

15. The drill according to claim 13 wherein said cutting insert includes a projecting cutting tip at its outer end.

16. The drill according to claim 11 wherein said spiral land includes a spiral groove and raised end in said lower spiral surface.

* * * * *